(12) United States Patent
Hudgins

(10) Patent No.: US 9,028,174 B1
(45) Date of Patent: May 12, 2015

(54) BOAT DOCKING BACKSTOP

(71) Applicant: Lonnie Hudgins, Sapulpa, OK (US)

(72) Inventor: Lonnie Hudgins, Sapulpa, OK (US)

( * ) Notice: Subject to any disclaimer, the term of this patent is extended or adjusted under 35 U.S.C. 154(b) by 0 days.

(21) Appl. No.: 14/465,114

(22) Filed: Aug. 21, 2014

(51) Int. Cl.
  *E02B 3/26* (2006.01)
  *E02B 3/06* (2006.01)
  *B63B 21/00* (2006.01)

(52) U.S. Cl.
  CPC . *E02B 3/26* (2013.01); *E02B 3/068* (2013.01); *B63B 2021/003* (2013.01)

(58) Field of Classification Search
  CPC ...... E02B 3/26; E02B 3/068; B63B 2021/003
  USPC .................................................. 405/212, 215
  See application file for complete search history.

(56) References Cited

U.S. PATENT DOCUMENTS

| | | | |
|---|---|---|---|
| 4,284,026 A * | 8/1981 | Martinson et al. ........ | 114/230.15 |
| 5,007,363 A * | 4/1991 | James ........................... | 405/212 |
| 5,007,609 A * | 4/1991 | Bredovskis ................... | 114/219 |
| 5,037,242 A * | 8/1991 | Nill ............................... | 405/215 |
| 5,113,702 A | 5/1992 | Capps | |
| 5,497,723 A | 3/1996 | Chase | |
| 5,762,016 A | 6/1998 | Parsons | |
| 5,911,189 A | 6/1999 | Ryan | |
| 6,112,690 A * | 9/2000 | Anderson ..................... | 405/213 |
| 6,119,616 A * | 9/2000 | Hannasch ................... | 114/230.1 |
| 6,349,661 B1 | 2/2002 | Dusek | |
| 7,322,307 B1 * | 1/2008 | Perry ............................. | 405/215 |
| 7,971,546 B1 * | 7/2011 | Sandor, Sr. ................... | 405/212 |
| 8,353,446 B2 | 1/2013 | Cox | |
| 2006/0182501 A1 * | 8/2006 | Griffen ......................... | 405/212 |
| 2010/0107954 A1 * | 5/2010 | Hall ......................... | 114/230.15 |

FOREIGN PATENT DOCUMENTS

GB 2415942 A * 1/2006

* cited by examiner

*Primary Examiner* — Frederick L Lagman
(74) *Attorney, Agent, or Firm* — Molly D. McKay

(57) ABSTRACT

A device that attaches to the center of a boat slip so a boat entering the slip will engage the device. The device consist of a central vertical member having a horizontal support bar on one end so that the horizontal support bar is approximately centered with respect to the vertical member and is approximately perpendicular thereto. Each end of the horizontal support bar is provided with a forwardly inclined leg that engages the rear end of an approaching boat as the boat backs into the boat slip. Each leg is capable of flexing slightly rearward when engaged by the boat to slow and stop the boat, preventing damage to both the boat and the dock. An alternate embodiment eliminates the vertical member.

11 Claims, 5 Drawing Sheets

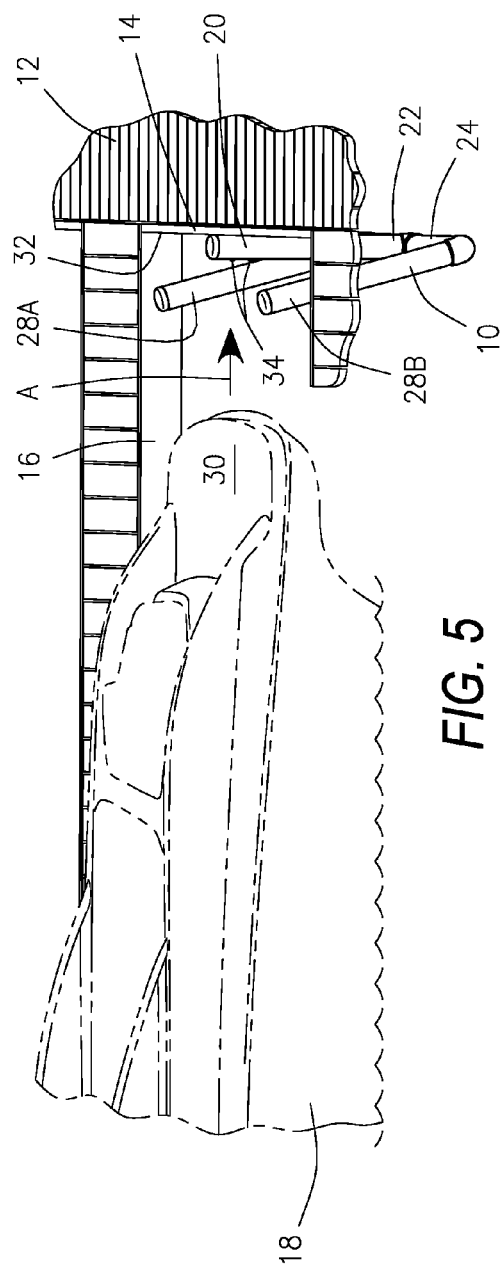
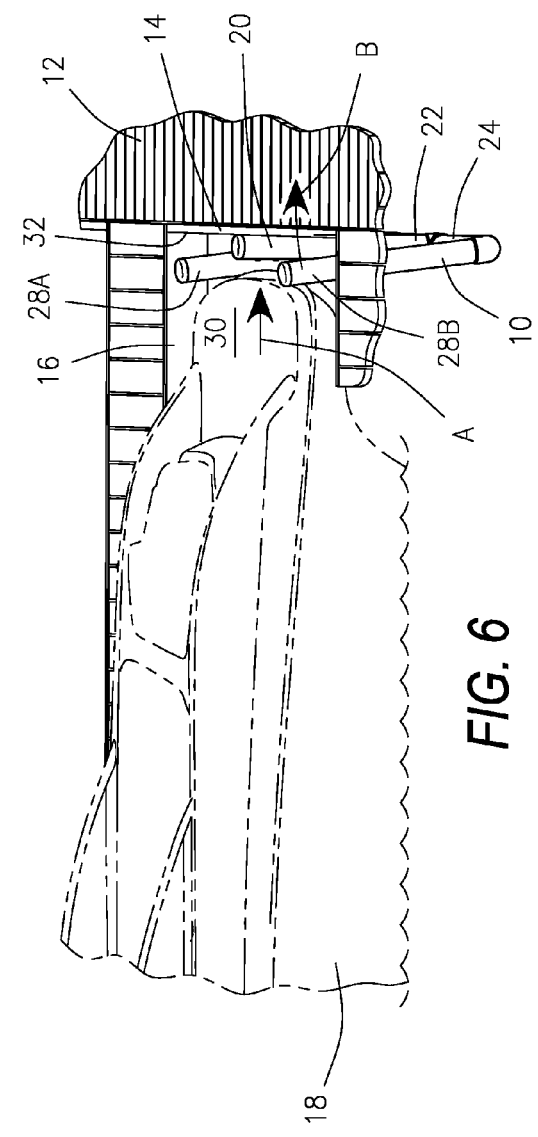

BOAT DOCKING BACKSTOP

BACKGROUND OF THE INVENTION

1. Field of the Invention

The present invention is a backstop that attaches to a boat dock and serves as a shock absorber to slow and cushion a boat as the boat is backed into a boat slip, thereby preventing damage to both the boat and the boat dock.

2. Description of the Related Art

A variety of devices have been used to protect a boat and a boat slip from damage that could occur as a boat is entering a boat slip. Many of these devices are attached on the sides of either the boat or the boat slip to prevent damage to the sides of the boat or boat slip. Other devices attach to the boat dock and are designed to receive the front end of a boat as the boat enters the boat slip.

The present invention is designed for use on a boat slip where a larger boat is to be docked. Larger boats generally enter a boat slip so that the back end of the boat enters the boat slip. The present invention is provided with at least two arms that are angled toward the water where the approaching boat will enter the boat slip. The arms are designed so that when the rear end of the boat engages with them, they will flex slightly rearward to act as a shock absorber to slow the approach of the boat and to prevent damage to both the boat and the boat slip as the boat is docked.

SUMMARY OF THE INVENTION

The present invention is a device that attaches to a boat dock. Specifically, the device secures to the center of a boat dock slip such that a boat entering the slip will engage the device which serves as a shock absorber to slow and stop the boat, thereby preventing damage to the boat and to the boat slip.

A preferred embodiment of the invention is provided with a central vertical member that is designed to be secured to a surface located on the dock approximately in the center of a boat slip. One end of the vertical member is provided with a horizontal support bar that is attached to the vertical member so that the horizontal support bar is approximately centered with respect to the vertical member. Each end of the horizontal support bar is provided with a forwardly inclined leg. Each leg forms an acute angle with the vertical member when viewed from the side, and both legs are at approximately the same incline such that both legs will engage the rear end an approaching of a boat approximately simultaneously as the boat backs into the boat slip. Although the angles at which the legs are positioned relative to the vertical member are not critical, the angle is preferably within the range of 45 to 5 degrees and the angle will preferably be determined by the size of the boat with which the device is to be employed.

Each leg is capable of flexing slightly rearward toward the vertical member when engaged by the rear end of a boat, thereby slowing and stopping the boat as the boat enters the boat slip to prevent damage to both the boat and the boat slip as the boat is docked.

An alternate embodiment of the invention eliminates the vertical member and the horizontal member attaches directly to a horizontal portion of the boat slip.

Both the preferred embodiment and the alternate embodiment can be installed with the legs angled downward or upward. The critical thing when installing either of the embodiments is that the arms are positioned on the dock where the rear of the boat will engage the arms as the boat is backed into the boat slip and that the legs are at such an angle that they can flex rearward sufficiently to serve as a shock absorber for an approaching boat.

Both of the embodiments may be secured to the boat dock by bolts, brackets or any other suitable attachment means.

Preferably, each embodiment is constructed of a material, such as for example high density polyethylene pipe, that will flex slightly without breaking and will return to its original configuration once pressure is removed. If polyurethane pipe is employed to construct the device, the pipe is preferably thermally fused together to accomplish the construction.

BRIEF DESCRIPTION OF THE DRAWINGS

FIG. 5 is a perspective view of the boat docking backstop of FIG. 1 shown with a boat approaching the boat slip.

FIG. 6 is a perspective view of the boat docking backstop of FIG. 5 shown with the boat engaging the backstop as the boat is docking.

DETAILED DESCRIPTION OF THE PREFERRED EMBODIMENT

Figure 1:
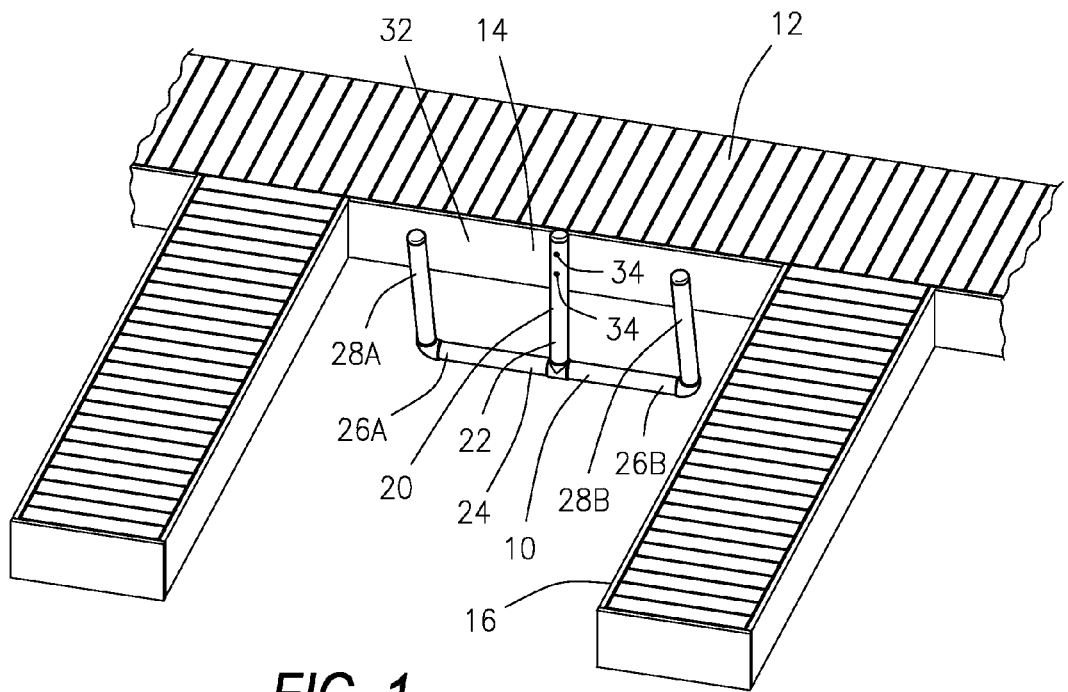
FIG. 1 is a perspective view of a boat docking backstop that is constructed in accordance with a preferred embodiment of the present invention, shown secured to a structure of a boat slip.
Figure 2:
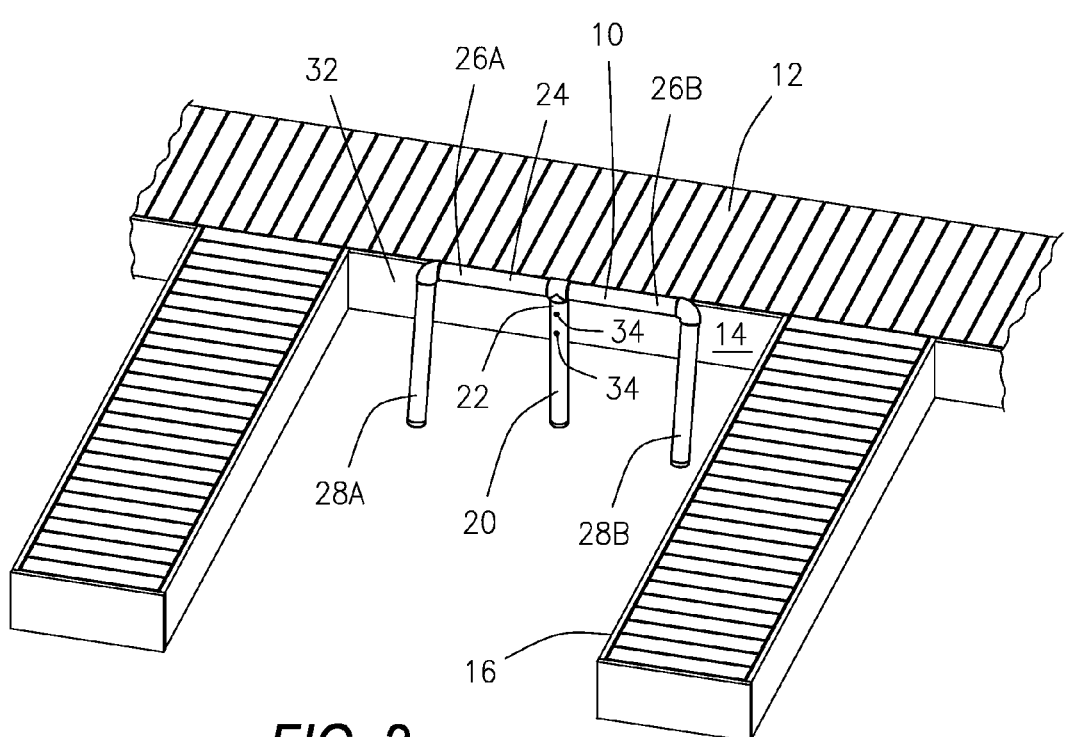
FIG. 2 is a perspective view of the boat docking backstop of FIG. 1 shown secured to a structure of a boat slip in an inverted orientation from that shown in FIG. 1.
Figure 3:
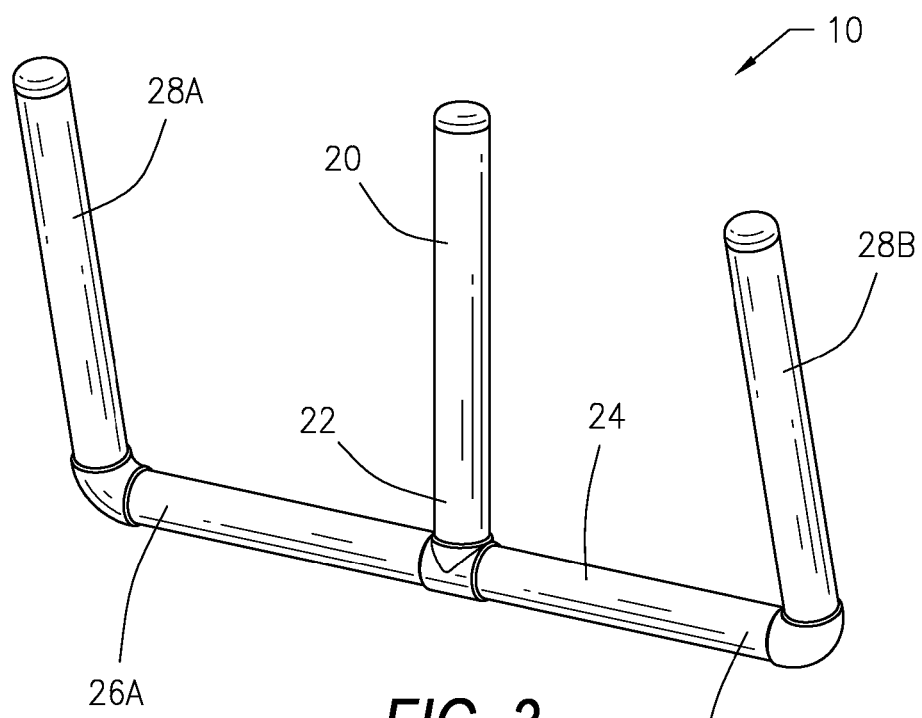
FIG. 3 is a perspective view of the boat docking backstop of FIGS. 1 and 2 shown removed from the boat slip.

Referring to the drawings and initially to FIGS. 1-3, the present invention is a boat docking backstop device 10 that attaches to a boat dock 12. Specifically, the device 10 secures to a vertical surface, a horizontal surface or other suitable structure 14 on the boat dock 12 at approximately the center of a boat dock slip 16 such that, as shown in FIGS. 5 and 6, a boat 18 entering the slip 16 will engage the device 10 which serves as a shock absorber to slow and stop the rearward motion of the boat 18, thereby preventing damage to the boat 18 and to the boat slip 16.

A preferred embodiment 10 of the invention is provided with a central vertical member 20 that is designed to be secured to a structure 14 located on the dock 12 approximately in the center of a boat slip 16. One end 22 of the vertical member 20 is provided with a horizontal support bar 24 that is attached to the vertical member 20 so that the horizontal support bar 24 is approximately centered with respect to the vertical member 20 and is approximately perpendicular to the vertical member 20. Each end 26A and 26B of the horizontal support bar 24 is provided with a forwardly inclined leg, 28A and 28B respectively.

Figure 4:
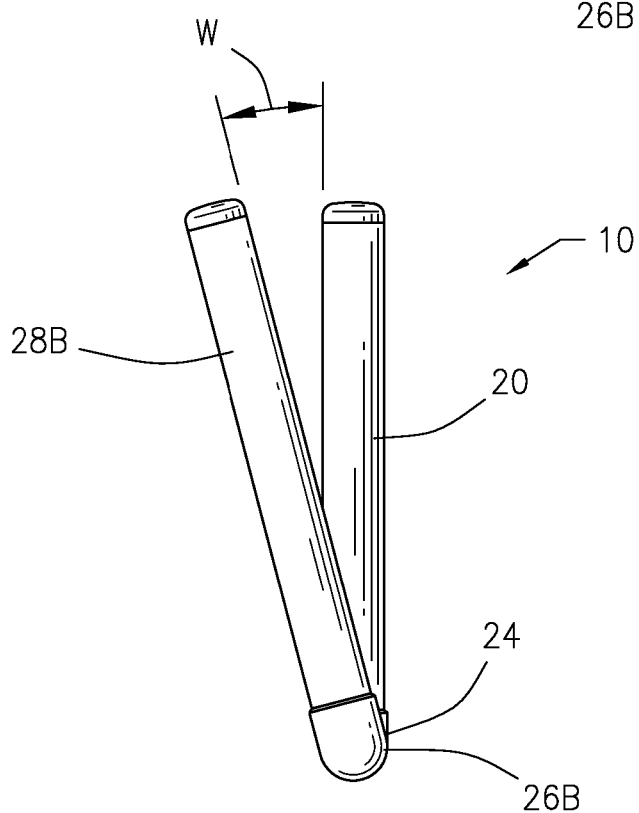
FIG. 4 is a side view of the boat docking backstop of FIG. 3.

Each leg 28A and 28B forms an acute angle W with the vertical member 20 when viewed from the side, as shown in FIG. 4. Although the angle W at which the legs are positioned relative to the vertical member are not critical, the angle W is preferably within the range of 45 to 5 degrees to provide sufficient distance for the legs 28A and 28B to flex backward to serve as a shock absorber for an approaching boat 18. A more preferable range of angle W is within the range of 25 to 5 degrees, with the most preferred range of angle @ being within the range of 15-5 degrees.

Also, both legs 28A and 28B are at approximately the same incline or angle W such that both legs 28A and 28B will engage the rear end 30 an approaching of a boat 18 approximately simultaneously as the boat 18 backs into the boat slip 16, as shown by Arrow A in FIGS. 5 and 6.

As illustrated in FIG. 6, each leg 28A and 28B is capable of flexing slightly rearward, as shown by Arrow B, toward the vertical member 20 when engaged by the rear end 30 of a boat 18, thereby slowing and stopping the boat 18 as the boat 18 enters the boat slip 16 to prevent damage to both the boat 18 and the boat slip 16 as the boat 18 is docked.

Figure 7:
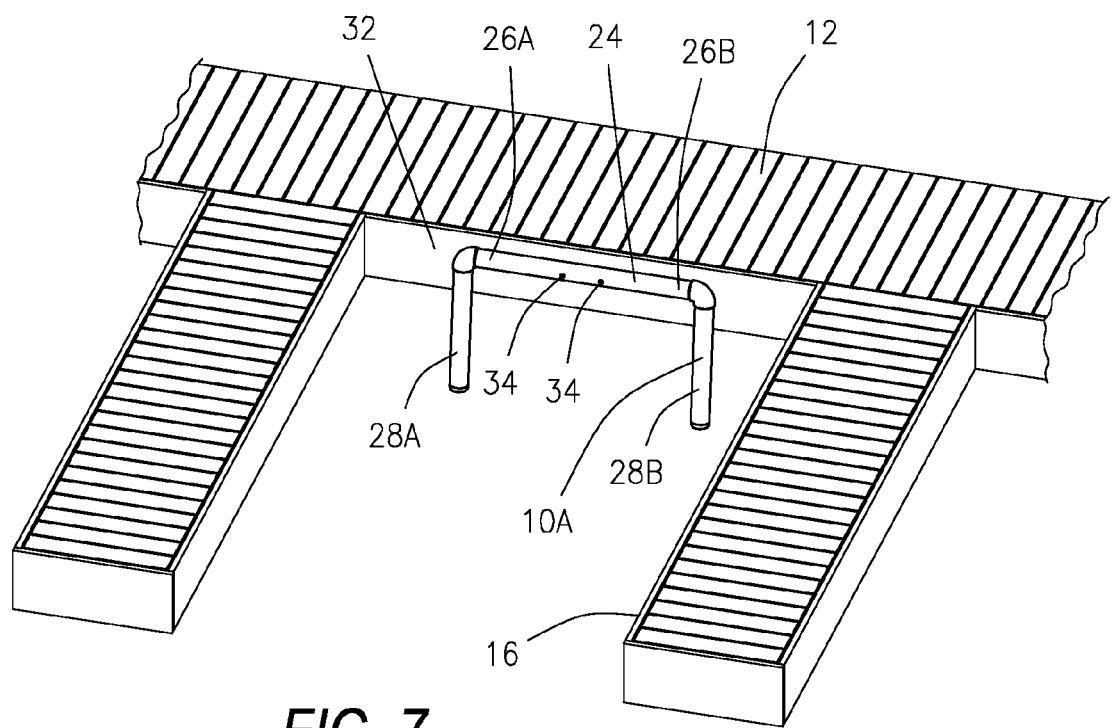
FIG. 7 is a perspective view of an alternate embodiment boat docking backstop shown secured to a horizontal portion of a boat slip.
Figure 8:
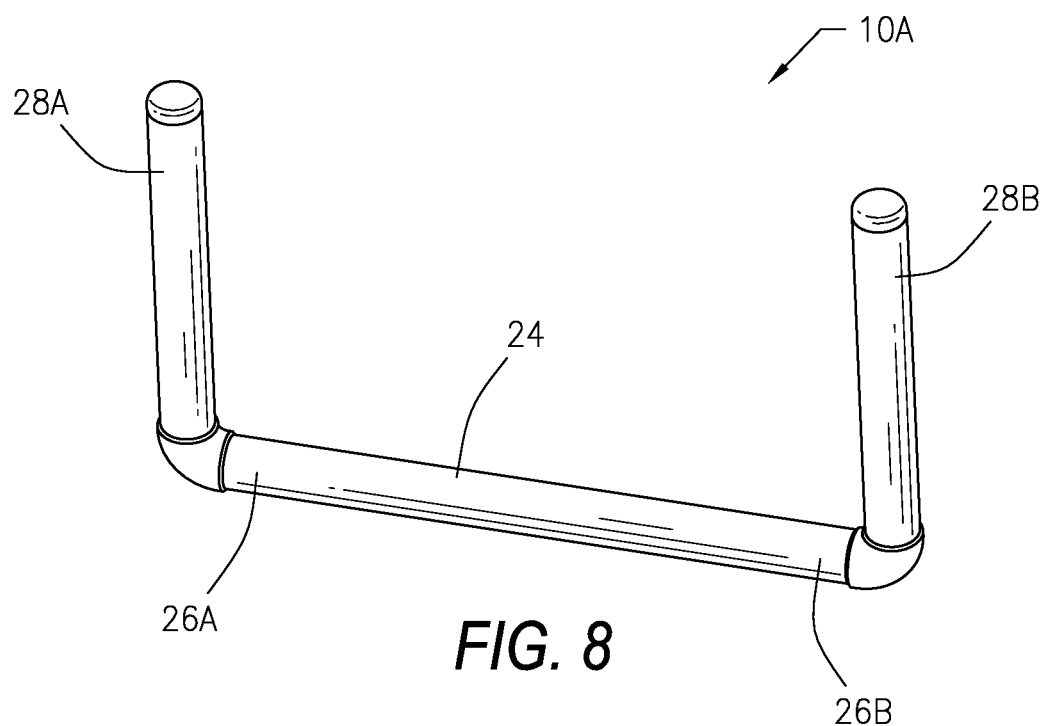
FIG. 8 is a perspective view of the alternate embodiment boat docking backstop shown removed from the boat slip.
Figure 9:
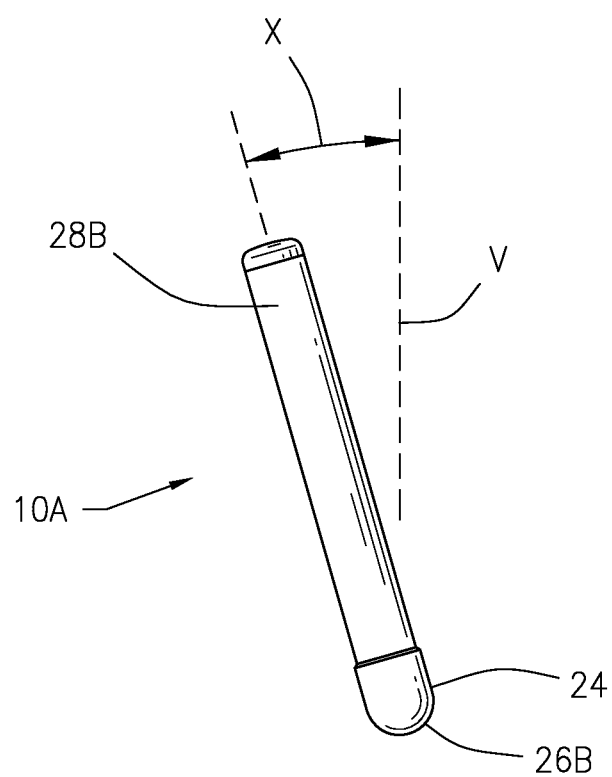
FIG. 9 is a side view of the alternate embodiment boat docking backstop of FIG. 8.

Referring now to FIGS. 7-9, there is illustrated an alternate embodiment 10A of the invention. The alternate embodiment 10A is similar to the preferred embodiment 10, but it eliminates the vertical member 20 and the horizontal member or horizontal support bar 24 attaches directly to a horizontal portion 32 of the boat slip 16. The angle of incline Angle X or the angle of each of the legs 28A and 28B relative to a vertical orientation, which is represented in FIG. 9 by dashed line V, for the legs 28A and 28B of the alternate embodiment 10A will be determined by the way that the horizontal support bar 24 mounts to the horizontal portion 32 of the boat slip 16, but the legs 28A and 28B will be installed so that they are inclined toward the incoming boat 18 and away from the boat dock 12.

Both the preferred embodiment 10 and the alternate embodiment 10A can be installed with the legs 28A and 28B angled downward, as illustrated for the preferred embodiment 10 in FIG. 1, or angled upward, as illustrated for the preferred embodiment 10 in FIG. 2. The critical thing when installing either of the embodiments 10 or 10A is that the arms 28A and 28B are positioned on the dock 12 at a location where the rear end 30 of the boat 18 will engage the arms 28A and 28B as the boat 18 is backed into the boat slip 16.

Both of the embodiments 10 and 10A are to be secured to the boat dock 12 by suitable attachment means 34, such as bolts, brackets, etc.

Preferably, each embodiment 10 and 10A is constructed of a material, such as for example polyethylene pipe that will flex slightly without breaking and will return to its original configuration once pressure is removed. If polyethylene pipe is employed to construct the device, the pipe is preferably thermally fused together to accomplish the construction.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A boat docking backstop comprising:
a horizontal support bar having two opposite ends,
each end of the horizontal support bar being provided with a leg that extends approximately perpendicular to the horizontal support bar, said horizontal support bar securable centrally to a boat slip in a boat dock such that the legs extend away from the boat dock and are at an acute angle to a vertical orientation,
said legs and said horizontal support bar constructed of a material that is capable of flexing rearward when pressure is exerted on the legs as a boat engages the legs and will resume their original orientation when pressure on the legs is released as the boat docks within the boat slip, and
wherein said horizontal support bar and said legs are constructed of plastic pipe that is secured together with plastic pipe fittings.

2. A boat docking backstop according to claim 1 wherein said horizontal support bar and said legs are thermally fused together with said plastic pipe fittings.

3. A boat docking backstop according to claim 2 wherein said horizontal support bar, said legs and said plastic pipe fittings are constructed of polyethylene.

4. A boat docking backstop comprising:
a horizontal support bar having two opposite ends,
each end of the horizontal support bar being provided with a leg that extends approximately perpendicular to the horizontal support bar, said horizontal support bar securable centrally to a boat slip in a boat dock such that the legs extend away from the boat dock and are at an acute angle to a vertical orientation,
said legs and said horizontal support bar constructed of a material that is capable of flexing rearward when pressure is exerted on the legs as a boat engages the legs and will resume their original orientation when pressure on the legs is released as the boat docks within the boat slip, and
a first end of a vertical member secured approximately centered on the horizontal support bar such that the legs are at an acute angle to the vertical member.

5. A boat docking backstop according to claim 4 further comprising:
attachment means for securing the vertical member to a vertical portion of a boat slip.

6. A boat docking backstop according to claim 5 wherein said horizontal vertical member, said support bar, and said legs are constructed of plastic pipe that is secured together with plastic pipe fittings.

7. A boat docking backstop according to claim 6 wherein said vertical member, said horizontal support bar, and said legs are thermally fused together with said plastic pipe fittings.

8. A boat docking backstop according to claim 7 wherein said vertical member, said horizontal support bar, said legs, and said plastic pipe fittings are all constructed of polyethylene.

9. A boat docking backstop according to claim 4 wherein the acute angle formed between the legs and a vertical orientation is within the range of 45 to 5 degrees.

10. A boat docking backstop according to claim 4 wherein the acute angle formed between the legs and a vertical orientation is within the range of 25 to 5 degrees.

11. A boat docking backstop according to claim 4 wherein the acute angle formed between the legs and a vertical orientation is within the range of 15 to 5 degrees.

* * * * *